United States Patent [19]
Winkle et al.

[11] 3,885,505
[45] May 27, 1975

[54] TRACK FOR MAGNETIC-SUSPENSION VEHICLE

[75] Inventors: Günther Winkle, Munich; Peter Mölzer, Hebertshausen; Peter H. Otto; Rudolf Zurek, both of Munich, all of Germany

[73] Assignee: Krauss-Maffei Aktiengesellschaft, Munich, Germany

[22] Filed: Jan. 18, 1974

[21] Appl. No.: 434,572

[30] Foreign Application Priority Data
Jan. 25, 1973  Germany............................ 2303515

[52] U.S. Cl.................. 104/148 LM; 104/148 MS
[51] Int. Cl............................................. B61b 13/08
[58] Field of Search......... 238/1, 122, 310, 25, 115, 238/265, 287, 304, 306; 104/148 MS, 148 LM

[56] References Cited
UNITED STATES PATENTS

| | | |
|---|---|---|
| 3,062,450 | 11/1962 | Hanff................................ 238/265 |
| 3,356,299 | 12/1967 | Boyer................................ 238/265 |
| 3,626,858 | 12/1971 | Colling............................ 104/148 LM |
| 3,780,668 | 12/1973 | Schwarzler...................... 104/148 MS |
| 3,783,794 | 1/1974 | Gopfert.......................... 104/148 MS |

*Primary Examiner*—M. Henson Wood, Jr.
*Assistant Examiner*—Reinhard J. Eisenzopf
*Attorney, Agent, or Firm*—Karl F. Ross; Herbert Dubno

[57] ABSTRACT

A track for a magnetic suspension vehicle comprises a steel profile mounted upon a concrete or other supporting structure and connected, e.g. by welding, to a U-section armature of the magnetic-suspension system and to a reaction rail of a linear induction motor. The profile member is at least partly embedded in the concrete supporting structure or beam along which it extends.

8 Claims, 1 Drawing Figure

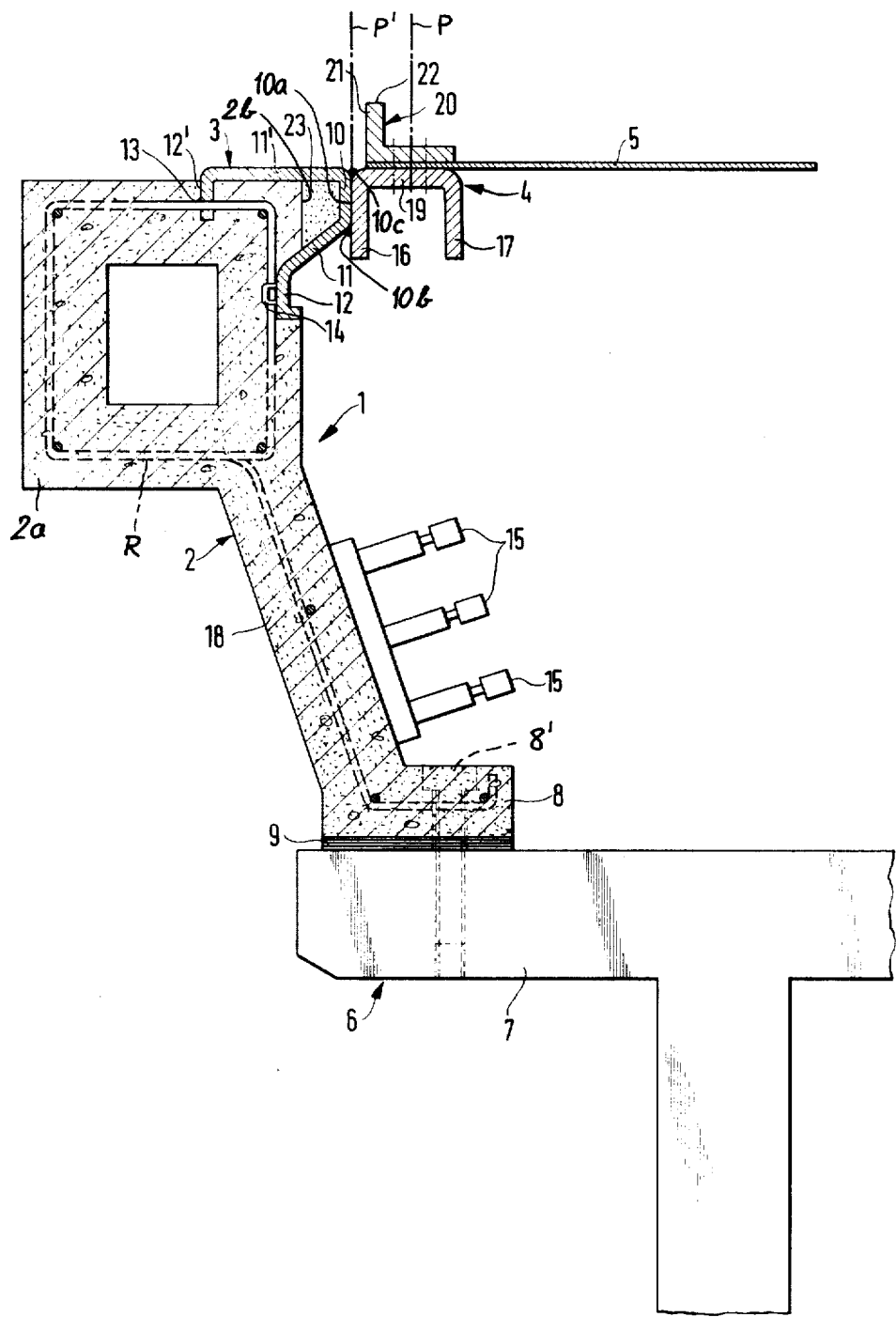

TRACK FOR MAGNETIC-SUSPENSION VEHICLE

CROSS-REFERENCE TO RELATED APPLICATION

The present application is related to the commonly assigned copending application Ser. No. 324,151 filed 16 Jan. 1973 and entitled TRANSPORT SYSTEM WITH MAGNETIC SUSPENSION VEHICLE (now U.S. Pat. No. 3,842,749).

FIELD OF THE INVENTION

The present invention relates to a track element for a magnetically guided and suspended vehicle, i.e. a so-called magnetic levitation vehicle. More particularly, the invention relates to a track structure in which the armature rail for the magnetic suspension and/or guide system and the reaction rail for a linear induction motor driving the vehicle and the supporting structure are integrated into a continuously extending system in which each element contributes to the structural strength of the others.

BACKGROUND OF THE INVENTION

In recent years interest has turned to the development of the low-friction systems for the transportation of passengers and freight within urban areas, between urban areas and between urban areas and rural areas at relatively high speeds.

It has been recognized that wheeled vehicles, such as railroad trains, are limited as to the speeds which can be developed by the frictional engagement of the driving wheels upon a rail or roadbed structure and hence attention has turned to levitation vehicles in which the vehicle is supported upon or suspended from a track with a minimum of frictional contact between the vehicle and the track. Such systems have been divided into two main types, namely, the air-cushion vehicle and the magnetic-levitation vehicle.

In the air-cushion vehicle, air is forced under pressure into a gap between confronting surfaces of a track and the vehicle or between the ground and the vehicle to develop a dynamic pressure which supports the vehicle as it is displaced along a desired path. In the magnetic-levitation vehicle, an electromagnetic field of force is created between the track structure and the vehicle to support the vehicle within predetermined gap spacing upon the track. The system may use attractive or repulsive magnetic fields and the suspension magnets may underhang or overhang the track structure with which it cooperates. Typical systems of this type have been described in the aforementioned application and in the applications cited therein.

In a typical magnetic suspension or magnetic-levitation system, the vehicle is displaced along a track by a linear induction motor cooperating with a reaction rail mounted along the track structure and propelling the vehicle in the desired direction. The track structure will include one or more armature rails which cooperate with electromagnets carried by the vehicle to develop a suspension field and means may be provided to maintain a suspension gap at a substantially constant value in spite of differences in the loading of the vehicle.

In transport systems of the last mentioned type, which must extend over long distances and be capable of sustaining vehicle speeds up to and exceeding 500 kms per hr., extremely precise orientation and dimensioning of the track structure is required and the parts thereof cooperating with the vehicle must be exceptionally rigid and of high strength to absorb the stresses without deformation. For example, the armature rails for suspension and guide purposes must be sufficiently stiff to prevent vibration and oscillation from developing and from varying the suspension and guide forces transmitted between these rails and the high speed vehicle.

On the other hand, the track structure should be of low cost and use a minimum of material since any unnecessary cross section is multiplied by the length of the system and adds to the expense brought about by the presence of unnecessary material.

Finally, it should be mentioned that the assembly, mounting and erection costs of such systems should be held to a minimum, especially if large networks of such tracks are contemplated to prevent the cost of the system from becoming prohibitive.

It has been proposed in the above identified application Ser. No. 324,151 (U.S. Pat. No. 3,842,749) to accomplish these requisites in a transport system for a magnetically suspended and guided vehicle by forming the track in part as structurally reinforced by the armature rail of magnetically attractable material and serving as an armature for the guide and/or suspension electromagnet carried by the vehicle, thereby allowing the support member of the track to be of reduced weight and less intrinsic strength.

More particularly, the system of the commonly owned earlier application comprises an armature rail of a magnetic suspension or magnetic-levitation vehicle system which is constructed and arranged to lend considerable structural strength to the circuit members to which it is fixed, thereby reducing the dimensions and mass of the support members without reducing the mechanical strength of the unit. In other words the armature rails and likewise the cores of the electromagnets, become structural members respectively of the track and the vehicle.

The system comprises a track defining a path for a vehicle and including a substantially continuous support member or beam and an armature-rail element fixed to and extending along the support member. The vehicle, magnetically supported or guided on the track for substantially contactless displacement therealong, includes a body member and at least one row of electromagnets extending in the direction of travel of the vehicle, on the vehicle-body member.

The electromagnets include respective cores juxtaposed with the armature rail element to form magnetic circuits closing through the cores and rails across air gaps for suspension or guidance, the air gaps being spanned by these magnetic fields.

The cores of each row or electromagnetic arrangement form a core element fixed to and extending along the vehicle body member generally parallel to the armature rail element, with at least one of these elements and preferably both being structural members reinforcing the track support and vehicle body members to which the rail element or core element is affixed.

Thus the row of electromagnet cores and/or the armature rails serve as stiffening elements for the vehicle and/or the track, respectively. The rows of magnetic cores and/or the armature rails thereby contribute to the vehicle and/or the track at least part of the requisite stiffness.

The magnetic cores are transformed into a stiffening element for the vehicle body by interconnecting them directly and rigidly by connecting members of nonferromagnetic material so that the row of magnetic cores acts substantially as a continuous metal channel of high structural strength and rigidly, in spite of the fact that the cores function individually. Hence structural elements which were, prior to the aforementioned application, required to provide the necessary stiffness in the longitudinal direction of the vehicle could be omitted or reduced in size, thereby enabling a weight saving and/or an increase in the load-carrying capacity of the vehicle.

The armature rail was preferably formed as an iron or steel profile with a high polar moment of inertia and high bending strength and modulus of elasticity with a configuration strongly resistant to bending in a vertical plane through the rail. The rail is, moreover, anchored to its support member or beam so as to be able to accept compressive and bending stresses applied thereto and can reinforce the beam against deflection under the vehicle load.

The armature rail thus constitutes a beam reinforcement adapted to carry all or part of the downward force transferred by the magnetic field from the vehicle to the track.

The use of one or more ferromagnetic rails of this character increases the selection of materials for the support members of the track and allows light-weight metallic or nonmetallic materials to be employed. Where the track is composed of concrete, the armature rail may constitute a reinforcing bar or can replace a substantial proportion of reinforcing rods or bars which would otherwise be required. The rails are so anchored to the support member that they may form tension or compression chords of the beam constituted by the uniting of the armature rail of the support member.

Preferably the structural elements formed by the armature rail are substantially of U-profile with the web of the U or its flanges lying in a vertical plane. The flanges of the U preferably form pole pieces of the armature rail for cooperation with the pole pieces of the magnet.

Where the structural elements are composed of steel, they have a high modulus of elasticity, at least by comparison with concrete, and increase the characteristic vibration frequency of the track. This has been found to be of considerable importance in control of vibrations.

While the aforedescribed system of application Ser. No. 324,151 (U.S. Pat. No. 3,842,749) represents a substantial improvement in track structures for magnetically suspended vehicles, there is a constant interest in increasing the structural stability of such systems still further and enabling the longitudinally extending horizontal supports to be made of increased rigidity and greater strength.

OBJECTS OF THE INVENTION

It is the principal object of the present invention to extend the principles set forth in the above identified application to track systems of still greater strength and stability.

It is another object of the invention to provide an improved track system, especially for magnetic suspension vehicles, which avoids earlier disadvantages of support track structures and permits the track members to be made of diminished cross section with greater rigidity and structural strength.

SUMMARY OF THE INVENTION

These objects and others which will become apparent hereinafter are attained, in accordance with the present invention, in a system in which the track structure comprises a generally horizontal and longitudinally extending beam, preferably of reinforced concrete and, advantageously, of prestressed concrete, a support and guide rail of thoroughly magnetic material extending along the track and cooperating with the suspension and/or guide electromagnets of the vehicle, and a connecting rail of a structurally stable profile integrated with the beam and secured to the armature rail. The connecting rail is, according to the invention, at least partially imbedded or cast in situ with the beam.

It may be mentioned that a major problem in track systems of magnetic suspension vehicles has heretofore been the stable anchorage of the suspension and guide rails and like system components which frequently must be positioned with great accuracy and prevented from the least instability under the aerodynamic stresses produced by high speed vehicles. Surprisingly, the connecting rail described above eliminates any difficulty on this score and permits the armature rail to be mounted stably and effectively at substantially lower cost than the systems used heretofore.

According to an important feature of the present invention, the hollow-profile connecting rail is completely filled with concrete of the support beam and has angled flanges or edges which engage in grooves or channels of the concrete support beam, the latter being generally prismatic and having at least one edge enclosed by and having its adjoining faces overlain by respective webs of the connecting rail.

According to another feature of the invention, other system components are attached to the support rail and these may include, for example, the reaction rail of a linear induction motor.

The connecting rail functions not only as a connecting piece between armature rail and the support, but also as a structural reinforcement for the latter and as a structural stiffening member for the armature rail. This effect is enhanced by providing the cross section of the connecting rail substantially in the configuration of a seven with a base web rigidly connected to one of the lateral members or shanks of a substantially U-section support and guide armature and with other webs which carry formations for anchorage in the beam or are provided with means for establishing the desired distance between the support and guide armature and the track beam.

The anchorage of the edges of the lateral webs or shanks of the connecting bar to the support beam of concrete can be improved by forming these lateral shanks with bores and/or eyes whereby the connecting bar can be rigidly fixed to part of the reinforcement of the beam.

When the connection between the support rail and the suspension and guide rail is effected by welding these two parallel rails together along their lengths, it has been found to be advantageous to provide each of the rails with a web or shank extending parallel to the shank of the other and forming a contact face between them. A weld seam is provided along this junction which, advantageously, lies in the plane of the neutral axis of the total profile formed by welding the two members together. Since the weld seam lies in the vertical plane of the neutral axis, the weld provides no additional strain nor does it cause warping of the profile, this being particularly important since a straightening of the junction can be effected only with the greatest of difficulty.

According to a feature of the invention, the track beam consists of reinforced and, if desired, prestressed concrete and has a profile which may generally be described as a P in which the hollow portion of the beam carries the connecting rail while the shank may extend at right angles to the hollow portion but preferably extends at an opposite angle thereto. A foot may be provided on the beam to facilitate anchoring thereof to spaced apart uprights or pylons.

The connecting rail may have generally the configuration of an L but preferably is a modified L with the general configuration of the numeral seven. Preferably one leg of the connecting rail overlies a horizontal surface of the beam while the adjoining leg overlies a vertical surface of the beam so that the connecting rail straddles an edge or corner of the beam and closely hugs the latter over the entire cross-section of the connecting rail such that the reinforced concrete of the beam or other filler completely fills the hollow of the connecting rail. With such a configuration, the integrated arrangement of the connecting rail is extremely stiff and rigid with a minimum of material whereby the track members may be made of unusual length and can be supported at widely spaced locations.

So that the moments upon the track elements may be minimized, it is desirable to have the force-receiving portions of the track element disposed vertically above the supporting portions of the track elements at which they are connected to the pylon. In other words, the foot by which the beam is mounted on the support lies vertically below the suspension and guide rail.

For the manufacture of the track assembly in a convenient manner the connecting rail and the suspension and guide rail are appropriately positioned with respect to one another and rigidly connected, whereupon the slack reinforcements of the reinforced concrete are tied to the connecting rail, e.g. welding, and the reinforced concrete beam is thereupon cast. This method of manufacture has the advantage that the support and guide rail of the completed track can be precisely positioned and oriented whereupon only shims or adjusting plates are required between the beam and the supports or pylons when the latter are mounted in place.

Furthermore, the system of the present invention allows unitary track elements to be used whether the member is part of a straight track or is formed as part of a curve. In this case the individual track elements can be disposed as segments of the curve which, because of the high speed, must be a relatively large radius of curvature. Of course curved connecting rails can be cast directly into and imbedded in straight beams without difficulty.

BRIEF DESCRIPTION OF THE DRAWING

The above and other objects, features and advantages of the present invention will become more readily apparent from the following description, reference being made to the accompanying drawing in which the sole FIGURE is a vertical cross-sectional view through one side of a track for a magnetic system and guide vehicle of the type described in the aforementioned copending application or the applications listed therein.

The track element or member illustrated in the drawing comprises a beam 2 of reinforced concrete which comprises a box-like upper hollow portion and a leg 18 extending downwardly and inwardly therefrom, the leg 18 terminating in a foot 8 which is mounted upon a pylon 7.

The track member 1 constitutes one side of a track in which the other side is identical to, but a mirror symmetrical counterpart of, the side illustrated and is mounted on a laterally extending arm of each pylon 7.

The track member 1 also comprises a connecting rail 3 which is cast into the concrete beam 2 at least in part, and is welded to a support and guide rail 4 or armature of the magnetic and guide system of the magnetic suspension or magnetic levitation vehicle. The latter may be of the type described and claimed in application Ser. No. 324,151 (U.S. Pat. No. 3,842,742) or any of the prior applications mentioned therein. The track member further carries a reaction rail 5 of a linear induction motor propelling the vehicle.

The rails 3, 4 and 5 of the operating system of the vehicle extend toward the center of the track, i.e. inwardly, and cooperate with outer magnetic members of the vehicle. Of course, the rails may extend outwardly when the vehicle is of the type in which it straddles the track and has inwardly oriented magnetic members.

The beam 2 has its foot 8 connected with the pylon 7 by bolts 8' in the vertical median plane P of the armature rail 4 and hence vertically below the force-applying location of the system. Furthermore, shims 9 may be provided between the foot 8 and the pylons 7 to adjust the level of the track member.

Along the upper inner edge of the box profile 2a of the beam, there is anchored the connecting rail 3 whose profile approximates a recumbent U or L but more specifically is that of a seven whose base leg 10 extends parallel to but is spaced somewhat inwardly from a corresponding edge 2b of the box profile 2a. The shank 10 abuts the leg 11 of the downwardly open U section armature rail 4 along the surface 10a which lies in a plane p' corresponding to the vertical plane of the neutral axis of the rail assemblies 3, 4, 5, the weld seam 10b and 10c connecting the rail 4 to the rail 3.

A lateral shank 11 of the connecting rail 3 extends downwardly and inwardly and has a flange 12 turned vertically downwardly and provided with bores 13 or eyes 14 which engage the slack reinforcements R of the reinforced concrete beam 2, e.g. by welding or simply looping through.

The downwardly turned edge 12' of the upper lateral shank 11' likewise is provided with bores or eyes 13, 14 imbedded in the concrete. The track is assembled by first welding the support and guide armature 4 to the connecting rail 3 after they have been precisely aligned and oriented and are curved, if desired, to provide a curved track.

These two rail members are then welded together, although they may be connected by bolts, and the connecting rail 3 is then positioned in the falsework of the concrete beam and connected to the reinforcing bars which can be inserted through and welded to the bores 13 and eyes 14. The concrete beam is then cast and, where desired, a foamed synthetic resin mass 23 may be filled into the space remaining and the hollow connecting rail 3.

As has been described in the aforementioned application, the armature rail 4 is of U profile with downwardly extending lateral shanks 16 and 17 forming the pole basis cooperating with the upwardly extending pole pieces of the cores of a respective row of electromangets on the vehicle. The lateral shanks 16 and 17 are thus extended below the connection weld 10b sufficiently to prevent any influence upon the suspension and guide magnetic field by the connecting rail 3.

Of course, a one piece construction of the connecting rail and suspension and guide armature can be used when the track system is to be extensive in which case it may pay to provide an extrusion press, bending apparatus or rolling mill especially for this purpose.

Along the inner flank, the shank 18 of the beam 2 may be provided with contact rails 14 which cooperate with shoes on the vehicle for applying electric current thereto.

The armature 4 is provided, along the base 19 of its U profile with an angle iron 20 serving to repeatedly connect the reaction rail 5 to this armature along one edge of the reaction rail. The angle iron or bar 20 further strengthens the system by stiffening the armature and prevents bending of the cantilevered reaction rail 5.

The upwardly extending free shank of the angle bar 20 serves as a brake rail which is engageable by a mechanical brake on the vehicle while the surface 22 forms an emergency running surface for the vehicle in case of loss of the magnetic suspension force. Of course, the reaction rail 5 can be mounted upon the shank 17 of the armature in which case the upper surface of the U profile base 19 may serve as an emergency running surface.

We claim:

1. In a track for a magnetic suspension vehicle having suspension and guide electromagnets, the improvement wherein said track comprises a longitudinally extending beam of reinforced concrete, a connecting rail rigid with said beam and at least in part imbedded therein along the length of said connecting rail, and an armature of U-profile extending along and connected to said connecting rail, said armature being adapted to cooperate with said electromagnets, said connecting rail having a hollow profile defining a base leg and a pair of lateral legs, said lateral legs having free edges remote from said base leg and imbedded in the concrete of said beam, said armature having a lateral shank rigidly connected to said base leg.

2. The improvement defined in claim 1, further comprising a reaction rail rigidly secured to said armature, said reaction rail being adapted to cooperate with a linear induction motor of said vehicle.

3. The improvement defined in claim 1 wherein said edges of said lateral legs are provided with formations being engaged with reinforcements of said reinforced concrete beam.

4. The improvement defined in claim 1 wherein said armature and said connecting rail together define a profile structure having a neutral axis and are connected together such that the contact area of said rails is arranged in said neutral axis.

5. The improvement defined in claim 4 wherein said beam has a generally L profile with a hollow-profile portion along its one side and a foot along its opposite side, said connecting rail being anchored to said hollow profile portion and straddling an edge thereof.

6. The improvement defined in claim 5, further comprising supports spaced along said track and means for connecting said foot to said support vertically in line with said armature.

7. The improvement defined in claim 6 wherein said armature is provided with a reaction rail cooperating with a linear induction motor of said vehicle and an angle bar reinforcement having an upwardly extending web engageable by a brake of the vehicle.

8. A method of erecting a track for a magnetic suspension vehicle which comprises the step of: orienting and positioning a connecting rail and an armature according to the desired course of said track, said armature cooperating with the magnets of said vehicle, thereafter securing said connecting rail and said armature rigidly together, connecting thereafter the connecting rail to reinforcements in a falsework, casting a concrete beam in said falsework with said connecting rail at least partly imbedded therein, and mounting said beam upon longitudinally spaced supports.

* * * * *